JOHN H. RISEMAN
STANLEY SHILLER
INVENTORS.

United States Patent Office 3,605,722
Patented Sept. 20, 1971

3,605,722
METHOD OF DIAGNOSING CYSTIC FIBROSIS
John H. Riseman, Cambridge, and Stanley Shiller, Needham, Mass., assignors to Orion Research Incorporated, Cambridge, Mass.
Continuation-in-part of application Ser. No. 621,895, Mar. 9, 1967. This application Nov. 18, 1969, Ser. No. 877,708
Int. Cl. A61b 5/05
U.S. Cl. 128—2.1R          1 Claim

ABSTRACT OF THE DISCLOSURE

A method for electrochemically diagnosing cystic fibrosis by wetting the cleansed skin of a patient with a solution containing chloride ions in a concentration of about forty (40) milliequivalents per liter and then determining the direction of drift of a signal developed by a chloride response electrode in contact with the patient's skin. This technique is advantageously carried out with an electrochemical electrode structure having an elongated body with an axial chamber and an annular chamber, both separated from one another. Both chambers contain a reference electrode and a reference electrolyte. One end of the structure includes an inset, flat, membrane sensitive to specific ions of one polarity forming a wall for the axial chamber.

In one form of the electrode, an annular leak, communicating with the annular chamber, surrounds and is spaced from the membrane surface, that end of the structure therefore providing a substantially flat, ridgeless surface. In another form, a ring-shaped membrane, sensitive to ions of opposite polarity, surrounds and is spaced from the central membrane, and no leak is used.

---

This application is a continuation-in-part of copending application Ser. No. 621,895, filed Mar. 9, 1967, now Pat. No. 3,492,216.

This invention relates to electrochemical systems and more particularly to a method of electrochemical diagnosis of a diseased condition.

It is known that ion-sensitive electrodes can be formed comprising membranes of ionically conductive material. These ionically conductive materials are used to separate two aqueous solutions, one of which is a reference solution having a substantially fixed concentration of ions, the other of which is a sample solution containing the ions, the concentration or activity of which is to be determined. A potential develops across the membrane in accordance with the well-known Nernst equation as a function of an ionic component of the sample solution and is usually measured with a high input impedance electrometer.

Specifically, such membranes may comprise certain salts of anions, such as bromide, chloride and sulfide, highly insoluble in aqueous solution, typically as quasi-amorphous masses or highly compressed polycrystallites. Such membranes can also be massive monocrystals of rare earth fluorides for sensing fluoride ions, or they may simply be known glasses sensitive, for example, to cations such as hydrogen, sodium or potassium ions. These membranes can also be formed of liquid ion-exchange material held in an inert, porous substrate.

Ordinarily, the measurement of electrochemical potential with this type of electrode involves the use of a reference electrode which is simultaneously in contact with the sample solution and is intended to maintain a constant potential with respect to the sample solution regardless of variations in the compositions of the latter. The reference electrode usually is an electrochemical half-cell comprising a suitable metal in contact with a substantially fixed concentration of its ions in aqueous solution, and means are provided so that the ionic medium of the half-cell can communicate via a liquid junction with the sample fluid.

Usually in order to insure that both electrodes are simultaneously in contact with the sample solution there must be a substantial quantity of the latter (e.g. 1 ml. or more). Particularly, where the ion-sensitive surface portion of the membrane of an ion-sensitive electrode is typically quite large (e.g. 1 cm.$^2$ or greater), it is important to have sufficient sample solution available to cover entirely that surface. Thus, ordinary electrodes with such large ion-sensitive area are not considered microelectrodes. The advantage of a larger electrode is, of course, that it is usually considerably less fragile than conventional microelectrodes and is easier and less expensive to fabricate.

It is known that an ion-sensitive electrode and a reference electrode can be combined in a single structure for simplification and convenience. However, such combination electrodes are not suitable for use as electrochemical sensors with microsamples of solution, nor can they readily be scaled down to microelectrode size without considerable expense and effort.

Objects of the present invention are to provide a method for detecting a pathological condition using electrochemical combination electrodes, and to provide a novel method of diagnosing cystic fibrosis.

Other objects of the present invention will in part be obvious and will in part appear hereinafter. The invention accordingly comprises the method involving the several steps and the relation of one or more of such steps with respect to each of the others; all of which are exemplified in the following detailed disclosure and the scope of the application of which will be indicated in the claim.

For a fuller understanding of the nature and objects of the present invention, reference should be had to the following detailed description taken in connection with the accompanying drawings wherein.

Figure 1:
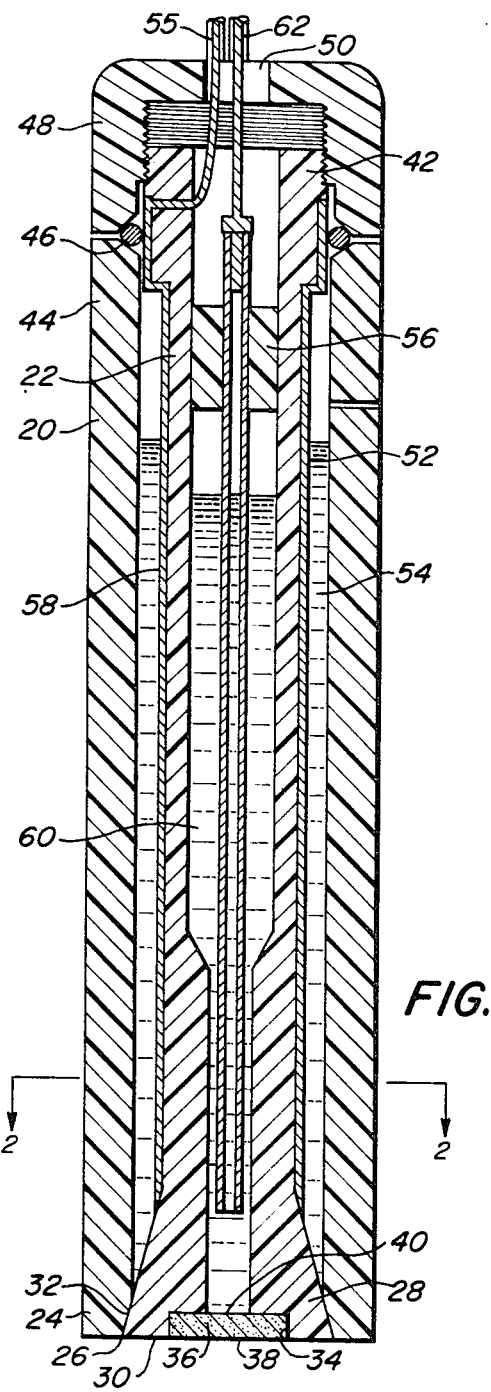
FIG. 1 is an elevated schematic view of a section through a portion of an electrode used in practising the method of the present invention.
Figure 2:
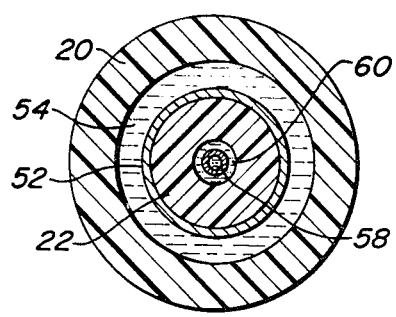
FIG. 2 is a section through a portion of an electrode of FIG. 1 taken along the line 2—2.
Figure 3:
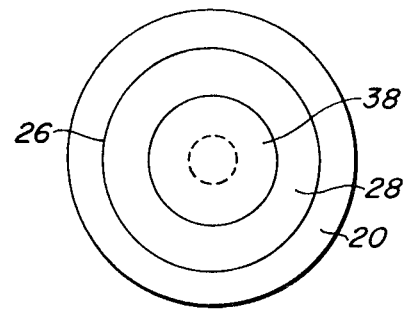
FIG. 3 is a bottom view of the electrode of FIG. 1 showing the ion-sensitive portion thereof.

Referring now to FIG. 1 there will be seen an embodiment of the electrode structure of the present invention including means for containing a body of reference electrolytic fluid and comprising preferably a double-walled container formed of outer shell 20 and inner tube 22. Preferably shell 20 and tube 22 are hollow cylinders and are coaxial with one another, shell 20 being larger in diameter than a central portion of tube 22. Shell 20 is preferably both formed of a high electrically resistive, preferably optically transparent, substantially chemically inert material (at least to the electrolytes involved), such as polyvinylchloride, polytetrafluoroethylene or the like. Tube 22 can be made from an electrically insulating, opaque material such as epoxy plastic or the like. One end 24 of shell 20 is internally conically tapered so that the opening at end 24 is enlarged, i.e. of greater diameter than the internal diameter of the remainder of the shell. End 24 of shell 20 terminates in a substantially flat manner, i.e. lies in a cross-sectional plane, so that the intersection of the internal conical taper and that plane forms a sharp circular edge 26 at the internal periphery of the opening at end 24.

Tube 22, which is of lesser internal diameter than and is spaced from the internal surfaces of shell 20, has one end portion 28 thereof shaped as a frustoconical member flaring outwardly to increase the external diameter of the tube. The conical angle of end portion 28 is matched to the angle of the internal taper of end 24 so that the two can be nested. End portion 28 is dimensioned so that when properly nested, planar surface 30 forming the frustum of the cone is coplanar with the plane of end 24. Preferably, both the internal surface of the taper of end 24 and the conical surface of end portion 28 are roughened so that the surface-to-surface junction 32 of the two provides a controllable leak as will appear hereinafter.

The central portion of surface 30 surrounding the opening to the internal portion of tube 22 is recessed or dished out to provide cavity 34. Fitted within cavity 34 is an ion-sensitive membrane 36, selected from the types hereinbefore described, preferably shaped as a disk, i.e. a short cylinder with planar, parallel end surfaces 38 and 40. Membrane 36 is disposed so that it fits tightly or is cemented so as to be leak-sealed around its periphery and surface 38 is coplanar and substantially contiguous with surfaces 30 and the plane of end 24, surface 40 being therefore a closure for the end of the inside of tube 22. Thus, edge 26 lies adjacent the conical periphery of tube 22 and the intersection of the two forms a concentric ring surrounding and coplanar with surface 38.

The other end 42 of tube 22 is slightly enlarged in diameter so as to fit snugly within shell 20 and the tube and shell are dimensioned so that when end portions 24 and 28 are nested, end 42 protrudes slightly beyond the other end 44 of the shell. End 42 is threaded about its external cylindrical periphery. End 44 adjacent the opening to the interior of the shell is beveled and supports in the bevel sealing means such as deformable O-ring 46.

Cap means 48 are provided, having an internal thread adapted to mesh with the threads on end 42 and having a central aperture 50. Cap means 48 are dimensioned so that when engaged with end 42, an edge of the cap bears an O-ring 46 and closing rotation of the cap means tends to force the frustoconical end of tube 22 into nesting relation with the taper of end 24 of shell 20.

The interspace between tube 22 and shell 20 is intended to contain a reference electrode half-cell, and for this reason, typically at least the central portion of tube 22 is coated with silver-silver chloride layer 52 and the interspace filled with reference electrolyte 54, such as saturated KCl having the usual substantially fixed chloride and silver levels. Layer 52 is connected to lead 55 which conveniently extends outwardly through central aperture 50 as a coaxial cable.

Positioned within tube 22 and extending preferably from a position adjacent end (but not touching membrane 36) to and through seal or plug 56 adjacent opposite end 42 of the tube, is electrically conductive reference electrode 58, usually of a metal and a salt thereof selected according to the nature of the ion to be measured. Thus, as shown, plug 56, tube 22, and membrane 36 form an enclosure in which is disposed a body of reference electrolyte 60 in contact with both membrane 36 and electrode 56. Electrode 56 is connected to the usual coaxial cable 62 which preferably extends through the central aperture of the cap. Conveniently, electrode 56 is a hollow tube so that the enclosure within which it is positioned can be filled by forcing fluid through the electrode itself from its upper end.

Typically, where membrane 36 is silver chloride, electrode 56 can be a silver-electrode and electrolyte 58 can be an aqueous solution with fixed silver levels, e.g. 0.1 N $AgNO_3$. Other typical electrode-electrolyte materials, depending on the nature of the membrane, will be obvious to those skilled in the art.

In operation, leads 62 and 65 are coupled to an appropriate electrometer and the planar, substantially ridgeless end of the electrode, formed by surface 38 and 30 and the flat portion of end 24, is placed in contact with the aqueous solution containing the ions, the activity of which is to be tested. As well known in the art, the potentials at the interface between layer 52 and electrolyte 54, and between electrode 58 and electrolyte 60 are substantially fixed. Similarly, the potential at the area where surface 40 contacts electrolyte 60 is also fixed. However, the potential at surface 38 will, as before noted, vary according to the activity of the ion to which membrane 36 is responsive. In order to complete the circuit, however, it is necessary to provide a "salt-bridge" between the test solution and the reference electrode half-cell comprising electrolyte 54 and layer 52. Because the taper of end 24 and the frustocone of end portion 28, although nested, do not form a seal, a minute amount of leakage will occur in the interface between the two so that an angular ring of electrolyte will tend to form at edge 26. Typically, if the frustocone and taper are formed of plastic material, random grinding of the respective surfaces with a coarse abrasive paper, such as #320 silicon carbide grit abrasive paper will insure that the proper controlled leakage will occur. Of course, the two surfaces should be roughened only to the extent necessary to provide the required electrical contact and should not permit leakage sufficient to contaminate the sample seriously. For example, the leakage should be uniform around edge 26 and its rate should be established in the order of about 0.1 ml./day.

It will be apparent that the electrode can be readily disassembled simply by unscrewing cap 48 whereby access can be had to the interspace between the shell and tube as for cleaning of the reference electrode and of the liquid port 64 is provided through which electrolyte fluid can be injected into the interspace between the shell and tube.

Figure 4:
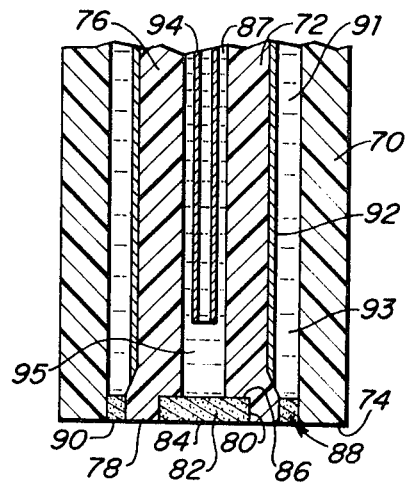
FIG. 4 is a schematic fragmentary view of a section through a portion of an electrode embodying principles of the present invention.
Figure 5:
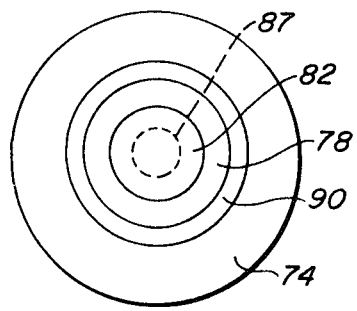
FIG. 5 is a bottom plan view of the electrode of FIG. 4.

Referring now to FIGS. 4 and 5 there will be seen an embodiment of the electrode structure incorporating principles of the present invention and comprising preferably a double-walled container formed of outer shell 70 and inner tube 72. Preferably shell 70 and tube 72 are hollow cylinders and are coaxial with one another, shell 70 being larger in internal diameter than the external diameter of tube 72. Shell 70 is preferably both formed of a high electrically resistive, preferably optically transparent, substantially chemically inert material (at least to the electrolytes involved), such as polyvinylchloride, polytetrafluorethylene or the like but is preferably a high-resistance glass. Tube 70 can be made from an electrically insulating, opaque material such as epoxy plastic or the like but preferably is also formed of high-resistance glass. End 74 of shell 70 terminates in a substantially flat manner, i.e. lies in a cross-sectional plane.

Tube 72, which is spaced from the internal surfaces of shell 70, has one end portion 76 thereof also terminating in a substantially flat surface 78 so that when portion 76 is properly nested in this end 74, surface 78 is coplanar with the plane of end 74. The central portion of surface 78 surrounding the opening to the internal portion of tube 72 is recessed or dished out to provide cavity 80. Fitted within cavity 80 is an ion-sensitive membrane 82, preferably shaped as a disk, i.e. a short cylinder with planar, parallel end surfaces 84 and 86. Membrane 82 is disposed so that it fits tightly or is cemented so as to be leak-sealed around its periphery and surface 84 is coplanar and substantially contiguous with surfaces 78 and the plane of end 74, surface 86 being therefore a closure for the end of the hollow inside 87 of tube 72.

Disposed between and sealed (as by epoxy resins, by melting, or the like) to tube 72 and shell 70 adjacent end portion 76 and end 74, is another ion-sensitive membrane 88, shaped as a ring having one surface 90 thereof substantially flat and coplanar with surfaces 84 and 78.

The other end of the tube and shell (not shown) may be formed similarly to the upper end of the embodiment of FIG. 1.

The interspace 91 between tube 72 and shell 70 is intended to contain a reference electrolyte, and for this reason, typically includes a first reference electrode. This latter can be formed by coating on its exterior (or the interior of shell 70) at least the central portion of tube 72 with silver-silver chloride layer 92. Interspace 91 is filled with reference electrolyte 93, such as saturated KCl having the usual substantially fixed chloride and silver levels. Layer 92 is connected to a lead (not shown) which conveniently extends outwardly through the opposite end of the electrode.

Positioned within tube 72 and extending preferably from a position adjacent but not touching membrane 82 to and through one opposite end of the tube, is second electrically conductive reference electrode 94, usually of a metal and a salt thereof selected according to the nature of the ion to be measured. Thus, as shown, interior 87 of tube 22 and membrane 82 form an enclosure in which is disposed a body of reference electrolyte 95 in contact with both membrane 82 and electrode 94. Electrode 94 is connected to the usual coaxial cable (not shown) which preferably extends to the opposite end of the electrode. Electrode 94 is a hollow tube for the same reasons as is electrode 58 of FIG. 1.

Typically, membrane 82 can be chloride-ion-responsive, e.g. silver chloride. In such case reference electrode 94 can be a silver-electrode and electrolyte 95 can be an aqueous solution with fixed silver levels, e.g. 0.1 N $AgNO_3$. Thus, membrane 88 can be sodium-ion-responsive, e.g. a known glass with a high sodium error. This configuration then is specifically responsive to the mean ionic activity of sodium chloride in solution. Obviously membrane 82 can be sodium-ion-responsive and membrane 88 then chloride-ion-responsive without substantially departing from the principles of the present invention. Other combinations of ion-responsive membranes can be used such as a known potassium responsive glass with a known bromide-responsive crystal, and the like.

Clearly one can thus use as one membrane any of a number of known anion-sensitive materials, and as the other membrane any of a number of known cation-sensitive materials.

In operation, leads to electrodes 94 and 92 are coupled to an appropriate electrometer and the planar, substantially ridgeless end of the electrode, formed by surfaces 90, 78 and 84 and the flat portion of end 74, is placed in contact with the aqueous solution containing the ions, the activity of which is to be tested. As well known in the art, the potentials at the interface between electrode 92 and electrolyte 93, and between electrode 94 and electrolyte 95 are substantially fixed. Similarly, the potentials at the areas where surface 86 and ring 88 respectively contact electrolytes 95 and 93 are also fixed. However, the potentials at surfaces 90 and 84 will, as before noted, vary according to the activity of the respective ions to which these membranes are responsive.

In FIG. 4, the potential thus read on the electrometer will be the difference in potential sensed at each membrane, hence for the NaCl example, a change of an order of magnitude in concentration of the NaCl in the solution under test will provide about a 120 mv. change in potential.

In FIG. 1 the electrical circuit having been completed by the provision of the "salt-bridge," any potential which arises across surface 38 will be accordingly apparent from the electrometer reading. Surprisingly, it has been found that with an electrode dimensioned so that the diameter of edge 26 is about ½″ and with a crystalline membrane of about ⅜″ diameter, a reading can be taken with test solution samples as small as 0.05 μl. Similar results will be obtained with the electrode of FIG. 4.

This attribute of the present invention is particularly important when the test sample is not readily available as a body of liquid but is normally spread out over a surface, as for example, as is found when one wishes to make electrochemical determination of ion activity in perspiration on the skin of a subject. This is of particular importance inasmuch as in certain diseases, such as cystic fibrosis, it has been found that the salt concentration in the sweat is considerably greater than that in a normal individual. Hitherto, it has been extremely difficult to measure either sodium or chloride ion activity in perspiration directly on the skin of a patient, and to acquire an adequate volume of sample for use with standard electrodes has been equally difficult. Most measurements made directly on the skin tend to exhibit severe drift and are very poorly reproducible. Concentrations of NaCl in normal perspiration are from about 20 to 40 milliequivalents per liter. Cystic fibrosis victims exhibit NaCl concentrations in their perspiration of from about 40 to 100 or more milliequivalents per liter.

The present electrode therefore lends itself admirably to a method of diagnosing cystic fibrosis because of the ability of the electrode to detect ion activity in extremely small samples on flat surfaces. One can use the present electrode to measure the absolute activity of chloride ion in perspiration on the skin but the problem of reproducibility nevertheless is not fully overcome. The optimum procedure is to clean an area of the skin of a patient thoroughly to remove oils, sebum, old perspiration and the like, by successive swabbing with ether, water, or similar solvents and then a final swabbing with a standardized pure solution containing 40 milliequivalents per liter of chloride. The electrode of the invention after careful cleaning of its exterior is then emplaced so that the ion-sensitive membrane and the annular leakage path both contact the thin film of standardized solution on the patient's skin. The electrometer is then observed for indication of the direction of drift. As the patient's perspiration is secreted and measured, if the patient does not have cystic fibrosis, his perspiration will tend to dilute the concentration of chloride of the standardized solution or not affect it. Should the patient be afflicted with cystic fibrosis, the high salt concentration of his perspiration will tend to increase the concentration of the chloride ion in the standardized solution. In either case, evaporation is not a particular problem inasmuch as the fluids under test are, for the most part, entrapped between the planar surface of the electrode and the patient's skin. The direction of drift of the electrometer will be indicative of the chloride concentrations of the perspiration so that a diagnosis can be very quickly made. In order to avoid any problem arising out of possible contamination of the minute sweat sample by leakage from edge 26, the electrode of FIG. 1 can be filled with reference electrolyte 54 so that the latter also contains only 40 milliequivalents of chloride per liter. This problem clearly does not exist with the electrode of FIG. 4.

Since certain changes may be made in the above process without departing from the scope of the invention herein involved it is intended that all matter contained in the above description or shown in the accompanying drawing shall be interpreted in an illustrative and not in a limiting sense.

What is claimed is:

1. Method of diagnosing cystic fibrosis and comprising the steps of:

cleansing the area of the skin of a patient;

applying to the cleansed area a solution containing chloride ions in a concentration of about 40 milliequivalents per liter;

contacting said solution with electrode means for providing a signal responsive to the activity of said chloride ions, and determining the direction of the change of said signal developed by said electrode means responsive to any changes in chloride ion activity due to the mixing of said patient's perspiration with said solution.

References Cited

UNITED STATES PATENTS

| | | | |
|---|---|---|---|
| 2,812,757 | 11/1957 | Lusk et al. | 128—2 |
| 3,289,671 | 12/1966 | Troutman et al. | 128—2.1 |
| 3,329,486 | 7/1967 | Rupe | 23—253 |
| 3,399,666 | 9/1968 | Broach | 128—2.1 |
| 3,447,904 | 6/1969 | Rupe | 23—230 |
| 3,449,080 | 6/1969 | Edwards | 23—230 |
| 3,474,775 | 10/1969 | Johnson | 128—2.1 |

OTHER REFERENCES

Knights et al.: Journ. of the Amer. Medical Assoc., vol. 169, No. 12 (March 1959), pp. 1279–80.

RICHARD A. GAUDET, Primary Examiner

K. L. HOWELL, Assistant Examiner

U.S. Cl. X.R.

23—230B; 128—2R